United States Patent [19]

Herd et al.

[11] Patent Number: 5,095,102

[45] Date of Patent: Mar. 10, 1992

[54] 6-SUBSTITUTED SULPHONYL-8-SULPHO-2-NAPHTHYL MONOAZO REACTIVE DYESTUFFS

[75] Inventors: Karl-Josef Herd, Odenthal-Holz; Manfred Hoppe, Kürten; Hermann Henk, Cologne; Rolf Brockmann, Bergisch-Gladbach; Frank-Michael Stöhr, Odenthal, all of Fed. Rep. of Germany

[73] Assignee: Bayer Aktiengesellschaft, Leverkusen, Fed. Rep. of Germany

[21] Appl. No.: 566,631

[22] Filed: Aug. 13, 1990

[30] Foreign Application Priority Data

Aug. 23, 1989 [DE] Fed. Rep. of Germany ....... 3927790

[51] Int. Cl.$^5$ .................... C09B 62/51; D06P 1/384
[52] U.S. Cl. .................... 534/638; 534/605; 534/612; 534/617; 534/630; 534/633; 534/634; 534/635; 534/640; 534/641; 534/642
[58] Field of Search ............... 534/617, 633, 634, 635, 534/638, 641, 642

[56] References Cited

U.S. PATENT DOCUMENTS

| | | | |
|---|---|---|---|
| 4,377,517 | 3/1983 | Mislin et al. | 534/638 |
| 4,560,388 | 12/1985 | Rohrer | 534/634 X |
| 4,652,634 | 3/1987 | Mischke et al. | 534/641 X |
| 4,935,501 | 6/1990 | Tzikas | 534/638 X |

FOREIGN PATENT DOCUMENTS 167490 1/1986 European Pat. Off. ............ 534/642
3800261 7/1989 Fed. Rep. of Germany ...... 534/642

OTHER PUBLICATIONS

Abstract of Japanese Patent 61-36 367 (2/21/86).
Abstract of Japanese Patent 01-108266 (4/25/89).

*Primary Examiner*—Mary C. Lee
*Assistant Examiner*—Fiona T. Powers
*Attorney, Agent, or Firm*—Sprung Horn Kramer & Woods

[57] ABSTRACT

Reactive dyestuffs of the formula

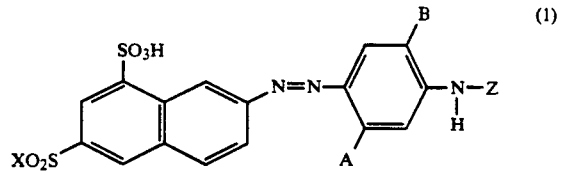

in which
A = H, halogen, alkyl, alkoxy, acylamino or amino,
B = H, alkyl or alkoxy,
X = —CH=CH$_2$ or —CH$_2$CH$_2$—Y, where
Y = a radical which can be removed under alkaline conditions and
Z = a fibre-reactive radical.

2 Claims, No Drawings

6-SUBSTITUTED SULPHONYL-8-SULPHO-2-NAPHTHYL MONOAZO REACTIVE DYESTUFFS

The invention relates to monoazo reactive dye-stuffs of the formula

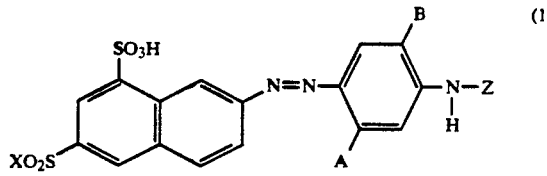

wherein
A = H, halogen, alkyl, alkoxy, acylamino or amino,
B = H, alkyl or alkoxy,
X = —CH=CH$_2$ or —CH$_2$CH$_2$—Y, where
Y = a radical which can be removed under alkaline conditions,
Z = a fibre-reactive radical,
halogen preferably represents Cl,
alkyl preferably represents optionally substituted C$_1$–C$_6$-alkyl and
acylamino preferably represents —NHCOR, —NHCONH$_2$, —NHCONHR', —NHSO$_2$R" or —NHCOOR", where
R = H, C$_1$–C$_6$-alkyl, cycloalkyl, C$_2$–C$_6$-alkenyl, phenyl, phenyl-C$_1$–C$_4$-alkyl, naphthyl, phenoxy or C$_1$–C$_4$-alkoxy,
R' = optionally substituted C$_1$–C$_6$-alkyl, cycloalkyl, phenyl-C$_1$–C$_4$-alkyl or phenyl and
R" = optionally substituted C$_1$–C$_6$-alkyl or phenyl,
it being possible for the alkyl, cycloalkyl, alkenyl, phenyl, phenylalkyl, naphthyl, phenoxy and alkoxy radicals mentioned to contain the customary substituents.

Examples of suitable substituents for the alkyl radicals are OH, Cl, Br, CN, COOH, COO-C$_1$–C$_4$-alkyl, OC$_1$–C$_4$-alkyl, SO$_3$H and SO$_2$X.

Examples of suitable substituents for the phenyl radicals are C$_1$–C$_4$-alkyl, Cl, Br, OH, COOH, SO$_3$H, NHCOC$_1$–C$_4$-alkyl, COOC$_1$–C$_4$-alkyl, C$_1$–C$_4$-alkoxy and SO$_2$X.

Suitable substituents for the naphthyl radicals are, in particular, Cl, Br, OH, COOH and SO$_3$H.

Suitable alkenyl radicals are allyl or CH=CH$_2$—CO$_2$H.

Suitable cycloalkyl radicals are cyclohexyl.

Examples of suitable radicals Y which can be removed under alkaline conditions are OSO$_3$H, OCOCH$_3$, SSO$_3$H and Cl.

Suitable fibre-reactive radicals, that is to say those which react with the OH or NH groups of the fibre under dyeing conditions to form covalent bonds, are, in particular, those which contain at least one reactive substituent bonded to a 5- or 6-membered aromatic-heterocyclic ring, or to a monoazine, diazine or triazine ring, in particular a pyridine, pyrimidine, pyridazine, pyrazine, thiazine, oxazine or asymmetric or symmetric triazine ring, or to a ring system of this type which contains one or more fused-on aromatic-carboxylic rings, for example a quinoline, phthalazine, cinnoline, quinazoline, quinoxaline, acridine, phenazine and phenanthridine ring system.

Examples which of the reactive substituents on the heterocyclic ring may be mentioned are halogen (Cl, Br or F), ammonium, including hydrazinium, pyridinium, picolinium and carboxypyridinium, sulphonium, sulphonyl, azido(N$_3$), thiocyanato, mercaptoether, hydroxyether, sulphinic acid and sulphonic acid.

Examples which may be mentioned specifically are: 2,4-difluorotriazin-6-yl, 2,4-dichlorotriazine-6-yl and monohalogeno-sym.-triazinyl radicals, in particular monochloro- and monofluorotriazinyl radicals substituted by alkyl, aryl, amino, monoalkylamino, dialkylamino, aralkylamino, arylamino, morpholine, piperidine, pyrrolidino, piperazino, alkoxy, aryloxy, alkylthio or arylthio, alkyl preferably denoting optionally substituted C$_1$–C$_4$-alkyl, aralkyl preferably denoting optionally substituted phenyl-C$_1$–C$_4$-alkyl and aryl preferably denoting optionally substituted phenyl or naphthyl, preferred substituents for alkyl being halogen, hydroxyl, cyano, vinylsulphonyl, substituted alkylsulphonyl, dialkylamino, morpholine, C$_1$–C$_4$-alkoxy, vinylsulphonyl-C$_2$–C$_4$-alkoxy, substituted alkylsulphonyl-C$_2$–C$_4$-alkoxy, carboxyl, sulpho or sulphato, and preferred substituents for phenyl and naphthyl being sulpho, C$_1$–C$_4$-alkyl, C$_1$–C$_4$-alkoxy, carboxyl, halogen, acylamino, vinylsulphonyl, substituted alkylsulphonyl, hydroxyl and amino.

The following radicals may be mentioned specifically: 2-amino-4-fluoro-triazin-6-yl, 2-methylamino-4-fluorotriazin-6-yl, 2-ethylamino-4-fluorotriazin-6-yl, 2-isopropylamino-4-fluoro-triazin-6-yl, 2-dimethylamino-4-fluorotriazin-6-yl, 2-diethylamino-4-fluoro-triazin-6-yl, 2-β-methoxy-ethylamino-4-fluorotriazin-6-yl, 2-β-hydroxyethylamino-4-fluoro-triazin-6-yl, 2-di-(β-hydroxyethylamino)-4-fluoro-triazin-6-yl, 2-β-sulphoethylamino-4-fluoro-triazin-6-yl, 2-β-sulphoethyl-methylamino-4-fluoro-triazin-6-yl, 2-carboxymethylamino-4-fluorotriazin-6-yl, 2-di-(carboxymethylamino)-4-fluoro-triazin-6-yl, 2-sulphomethyl-methylamino-4-fluoro-triazin-6-yl, 2-β-cyanoethylamino-4-fluoro-triazin-6-yl, 2-benzylamino-4-fluoro-triazin-6-yl, 2-β-phenylethylamino-4-fluorotriazin-6-yl, 2-benzyl-methylamino-4-fluoro-triazin-6-yl, 2-(4'-sulphobenzyl)-amino-4-fluoro-triazin-6-yl, 2-cyclohexylamino-4-fluoro-triazin-6-yl, 2-(o-, m- and p-methylphenyl)-amino-4-fluoro-triazin-6-yl, 2-(o-, m- and p-sulphophenyl)-amino-4-fluoro-triazin-6-yl, 2-(2',5'-disulphophenyl)-amino-4-fluoro-triazin-6-yl, 2-(o-, m- and p-chlorophenyl)-amino-4-fluoro-triazin-6-yl, 2-(o-, m- and p-methoxyphenyl)-amino-4-fluoro-triazin-6-yl, 2-(2'-methyl-4'-sulphophenyl)-amino-4-fluoro-triazin-6-yl, 2-(2'-methyl-5'-sulphophenyl)-amino-4-fluoro-triazin-6-yl, 2-(2'-chloro-4'-sulphophenyl)-amino-4-fluoro-triazin-6-yl, 2-(2'-chloro-5'-sulphophenyl)-amino-4-fluorotriazin-6-yl, 2-(2'-methoxy-4'-sulphophenyl)-amino-4-fluoro-triazin-6-yl, 2-(o-, m- and p-carboxyphenyl)-amino-4-fluoro-triazin-6-yl, 2-(2',4'-disulphophenyl)-amino-4-fluoro-triazin-6-yl, 2-(3',5'-disulphophenyl)-amino-4-fluoro-triazin-6-yl, 2-(2'-carboxy-4'-sulphophenyl)-amino-4-fluoro-triazin-6-yl, 2-(2'-carboxy-5'-sulphophenyl)-amino-4-fluoro-triazin-6-yl, 2-(6'-sulphonaphth-2'-yl)-amino-4-fluoro-triazin-6-yl, 2-(4',8'-disulphonaphth-2'-yl)-amino-4-fluoro-triazin-6-yl, 2-(6',8'-disulphonaphth-2'-yl)-amino-4-fluoro-triazin-6-yl, 2-(N-methyl-N-phenyl)-amino-4-fluoro-triazin-6-yl, 2(N-ethyl-N-phenyl)-amino-4-fluoro-triazin-6-yl, 2-(N-β-hydroxyethyl-N-phenyl)-amino-4-fluoro-triazin-6-yl, 2-(N-iso-propyl-N-phenyl)-amino-4-fluoro-triazin-6-yl, 2-morpholine-4-fluoro-triazin-6-yl, 2- piperidino-4-fluorotriazin-6-yl, 2-(4',6',8'-trisulphonaphth-2'-yl)-amino-4-fluoro-triazin-6-yl, 2-(3',6',8'-trisulphonaphth-2'-yl)-amino-4-fluoro-triazin-6-yl, 2-(3',6'-disulphonaphth-1'-yl)-amino-4-fluoro-triazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl, 2-methoxy-4-fluoro-triazin-6-yl, 2-ethoxy-4-fluoro-triazin-6-yl, 2-phenoxy-4-fluoro-triazin-6-yl, 2-(o-, m- or p-sulphophenoxy)-4-fluoro-triazin-6-yl, 2-(o-, m- or p-methyl- or -methoxy-phenoxy)-4-fluoro-triazin-6-yl, 2-β-hydroxyethylmercapto-4-fluoro-triazin-6-yl, 2-phenylmercapto-4-fluoro-triazin-6-yl, 2-(4'-methylphenyl)-mercapto-4-fluorotriazinyl, 2-(2',4'-dinitrophenyl)-mercapto-4-fluoro-triazin-6-yl, 2-methyl-4-fluoro-triazin-6-yl, 2-phenyl-4-fluoro-triazin-6yl and the corresponding 4-chloro- and 4-bromotriazinyl radicals, and the corresponding radicals obtainable by replacement of halogen with tertiary bases, such as trimethylamine, triethylamine, dimethyl-β-hydroxyethylamine, triethanolamine, N,N-dimethylhydrazine, pyridine, α-, β- or γ-picoline, nicotinic acid or isonicotinic acid, sulphinates, in particular benzenesulphinic acid, or bisulphite.

The halogenotriazinyl radicals can also be linked to a second halogenotriazinyl radical or a halogenodiazinyl radical or one or more vinylsulphonyl or sulphatoethylsulphonyl radicals, for example via a bridge member

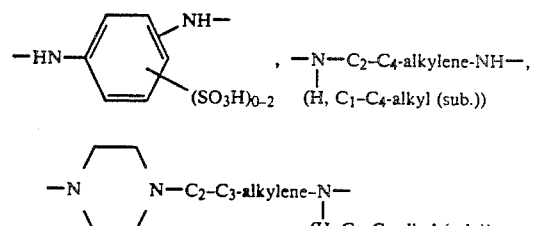

or in the case of the sulphatoethylsulphonyl or vinylsulphonyl group, via a bridge member

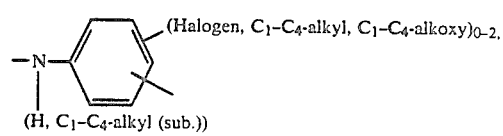

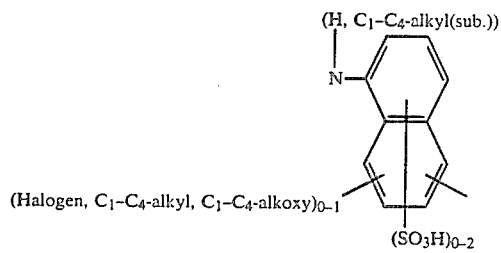

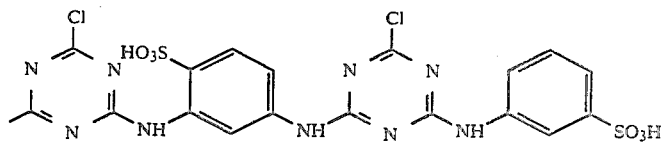

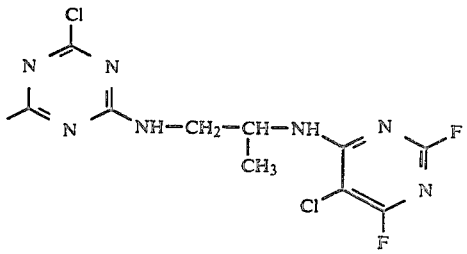

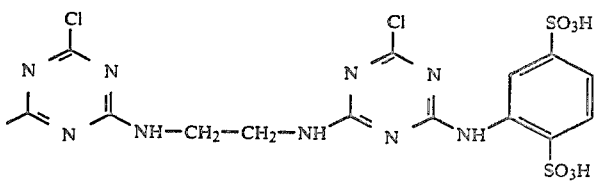

-continued
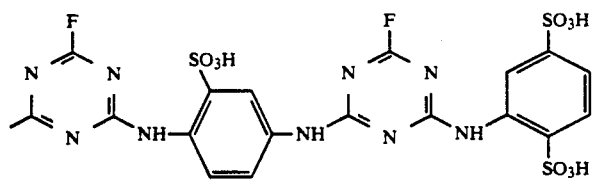
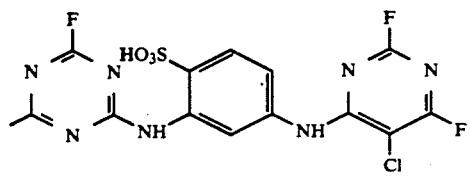
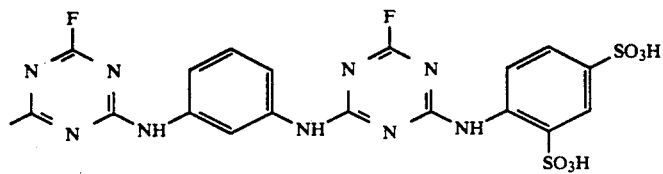
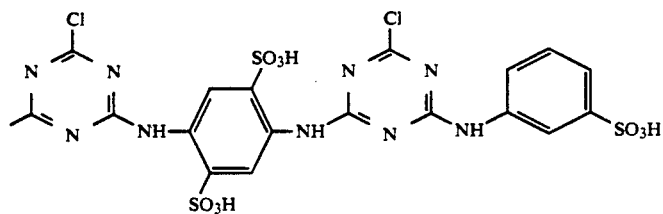
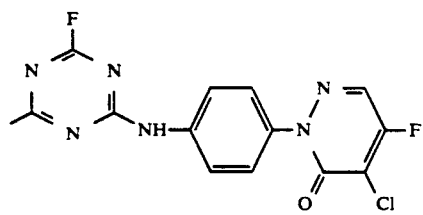
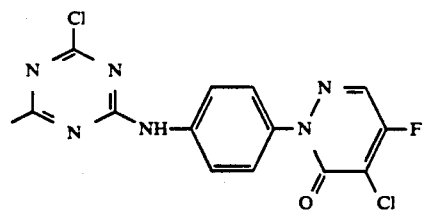
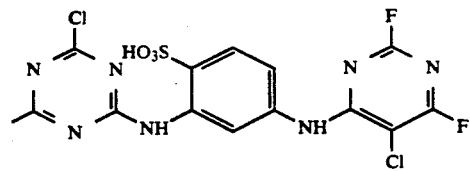
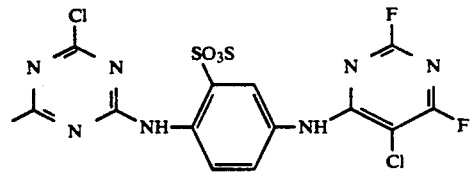

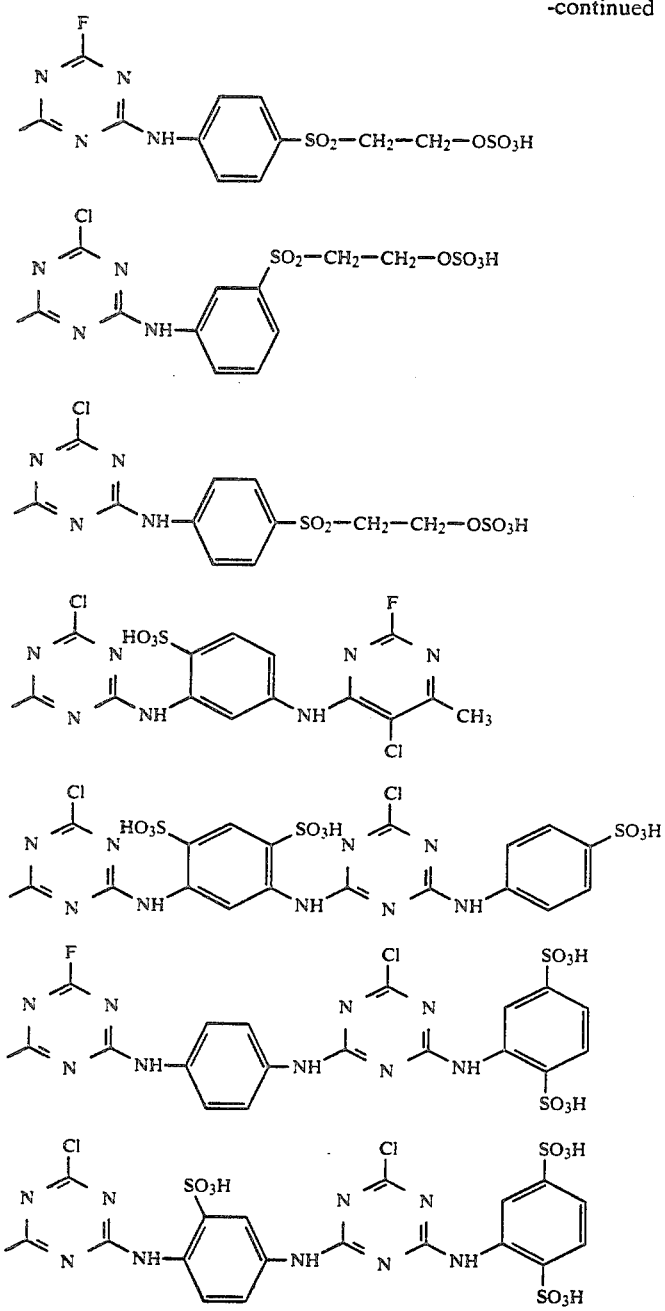

Mono-, di- or trihalogenopyrimidinyl radicals, such as 2,4-dichloropyrimidin-6-yl-, 2,4,5-trichloropyrimidin-6-yl-, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carbalkoxy-pyrimidin-6-yl-, 2,6-dichloropyrimidine-4-carbonyl-, 2,4-dichloropyrimidine-5-carbonyl-, 2-chloro-4-methyl-pyrimidine-5-carbonyl-, 2-methyl-4-chloropyrimidine-5-carbonyl-, 2-methylthio-4-fluoropyrimidine-5-carbonyl-, 6-methyl-2,4-dichloropyrimidine-5-carbonyl-, 2,4,6-trichloropyrimindine-5-carbonyl-, 2,4-dichloropyrimidine-5-sulphonyl-, 2-chloro-quinoxaline-3-carbonyl-, 2- or 3-monochloroquinoxaline-6-carbonyl-, 2- or 3-monochloroquinoxaline-6-sulphonyl-, 2,3-dichloroquinoxaline-5- or -6-carbonyl-, 2,3-dichloroquinoxaline-5- or -6-sulphonyl-, 1,4-dichlorophthalazine-6-sulphonyl- or -6-carbonyl-, 2,4-dichloroquinazoline-7- or -6-sulphonyl- or -carbonyl-, 2- or 3- or 4-(4',5'-dichloro-6'-pyridazon-1'-yl)-phenylsulphonyl- or -carbonyl-, β-(4',5'-dichloro-6'-pyridazon-1'-yl)-ethylcarbonyl-, N-methyl-N-(2,3-dichloroquinoxaline-6-sulphonyl)-aminoacetyl- and N-methyl-N-(2,3-dichloroquinoxaline-6-carbonyl)-amino-acetyl- and the corresponding bromine and fluorine derivatives of the abovementioned chlorine-substituted heterocyclic radicals, and amongst these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluoro-dichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methylsulphonylpyrimidin-6-yl, 2,6-difluoro-5-methyl-sulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazin-6-yl-, 2-(3'-carboxyphenyl)-sulphonyl-4-chloro-triazin-6-yl-, 2-(3'-sulphophenyl)-sulphonyl-4-chlorotriazin-6-yl- and 2,4-bis-(3'-carboxyphenylsulphonyl)-triazin-6-yl; pyrimidine rings containing sulphonyl groups, such as 2-carboxymethylsulphonyl-pyrimidin-4-yl-, 2-methylsulphonyl-6-methyl-pyrimidin-4-yl-, 2-methylsulphonyl-6-ethylpyrimidin-4-yl-, 2-phenylsulphonyl-5-chloro-6-methylpyrimidin-4-yl-, 2,6-bis-methylsulphonyl-pyrimidin-4-yl-, 2,6-bis-methylsulphonyl-5-chloro-pyrimidin-4-yl-, 2,4-bis-methylsulphonylpyrimidine-5-sulphonyl-, 2-methylsulphonyl-pyrimidin-4-yl-, 2-phenylsulphonyl-pyrimidin-4-yl-, 2-trichloromethylsulphonyl-6-methyl-pyrimidin-4-yl-, 2-methylsulphonyl-5-chloro-6-methyl-pyrimidin-4-yl-, 2-methylsulphonyl-5-bromo-6-methyl-pyrimidin-4-yl-, 2-methylsulphonyl-5-chloro-6-ethyl-pyrimidin-4-yl-, 2-methylsulphonyl-5-chloro-6-chloromethyl-pyrimidin-4-yl-, 2-methylsulphonyl-4-chloro-6-methylpyrimidine-5-sulphonyl, 2-methylsulphonyl-5-nitro-6-methylpyrimidin-4-yl-, 2,5,6-tris-methylsulphonyl-pyrimidin-4-yl-, 2-methylsulphonyl-5,6-dimethyl-pyrimidin-4-yl-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methylsulphonylpyrimidin-6-yl, 2,6-difluoro-5-methyl-sulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazin-6-yl-, 2-(3'-carboxyphenyl)-sulphonyl-4-chlorotriazin-6-yl-, 2-(3'-sulphophenyl)-sulphonyl-4-chlorotriazin-6-yl- and 2,4-bis-(3'-carboxyphenylsulphonyl)-triazin-6-yl; pyrimidine rings containing sulphonyl groups, such as 2-carboxymethylsulphonyl-pyrimidin-4-yl-, 2-methylsulphonyl-6-methyl-pyrimidin-4-yl-, 2-methylsulphonyl-6-ethyl-pyrimidin-4-yl-, 2-phenylsulphonyl-5-chloro-6-methyl-pyrimidin-4yl-, 2,6-bis-methylsulphonyl-pyrimidin-4-yl-, 2,6-bis-methylsulphonyl-5-chloro-pyrimidin-4-yl-, 2,4-bis-methylsulphonyl-pyrimidine-5-sulphonyl-, 2-methylsulphonylpyrimidin-4-yl-, 2-phenylsulphonyl-pyrimidin-4-yl-, 2-trichloromethylsulphonyl-6-methyl-pyrimidin-4-yl-, 2-methylsulphonyl-5-chloro-6-methyl-pyrimidin-4-yl-, 2-methylsulphonyl-5-bromo-6-methyl-pyrimidin-4yl-, 2-methylsulphonyl-5-chloro-6-ethyl-pyrimidin-4-yl, 2-methylsulphonyl-5-chloro-6-chloromethyl-pyrimidin-4-yl-, 2-methylsulphonyl-4-chloro-6-methyl-pyrimidine-5-sulphonyl-, 2-methylsulphonyl-5-nitro-6-methylpyrimidin-4-yl-, 2,5,6-tris-methylsulphonyl-pyrimidin-4-yl-, 2-methylsulphonyl-5,6-dimethyl-pyrimidin-4-yl-, 2-ethylsulphonyl-5-chloro-6-methyl-pyrimidin-4-yl, 2-methylsulphonyl-6-chloro-pyrimidin-4-yl-, 2,6-bis-methylsulphonyl-5-chloropyrimidin-4-yl-, 2-methylsulphonyl-6-carboxypyrimidin-4-yl-, 2-methylsulphonyl-5-sulpho-pyrimidin-4-yl-, 2-methylsulphonyl-6-carbomethoxy-pyrimidin-4yl-, 2-methylsulphonyl-5-carboxy-pyrimidin-4-yl-, 2-methylsulphonyl-5-cyano-6-methoxy-pyrimidin-4-yl-, 2-methylsulphonyl-5-chloro-pyrimidin-4-yl-, 2-β-sulphoethylsulphonyl-6-methyl-pyrimidin-4-yl-, 2-methylsulphonyl-5-bromo-pyrimidin-4-yl-, 2-phenylsulphonyl-5-chloro-pyrimidin-4-yl-, 2-carboxymethylsulphonyl-5-chloro-6-methyl-pyrimidin-4-yl-, 2-methylsulphonyl-6-chloropyrimidine-4- and -5-carbonyl-, 2,6-bis-(methylsulphonyl)-pyrimidine-4- or -5-carbonyl-, 2-ethylsulphonyl-6-chloropyrimidine-5-carbonyl-, 2,4-bis-(methylsulphonyl)-pyrimidine-5-sulphonyl- and 2-methylsulphonyl-4-chloro-6-methylpyrimidine-5-sulphonyl- or -carbonyl-; 2-chlorobenzothiazole-5- or -6-carbonyl- or -5- or -6-sulphonyl-, 2-arylsulphonyl- or alkylsulphonyl-benzothiazole-5- or -6-carbonyl- or -5- or -6-sulphonyl- such as 2-methylsulphonyl- or 2-ethylsulphonyl-benzothiazole-5- or -6-sulphonyl- or -carbonyl-, 2-phenylsulphonylbenzothiazole-5- or -6-sulphonyl- or -carbonyl- and the corresponding 2-sulphonylbenzothiazole-5- or -6-carbonyl- or -sulphonyl- derivatives containing sulpho groups in the fused-on benzene ring, 2-chlorobenzoxazole-5- or -6-carbonyl- or -sulphonyl-, 2-chlorobenzimidazole-5- or -6-carbonyl- or -sulphonyl, 2-chloro-1-methylbenzimidazole-5- or -6-carbonyl- or -sulphonyl-, 2-chloro-4-methyl-(1,3)thiazole-5-carbonyl- or -4- or -5-sulphonyl- and the N-oxide of 4-chloro- or 4-nitroquinoline-5-carbonyl.

Reactive groups of the aliphatic series may furthermore be mentioned, such as acryloyl-, mono-, di- or trichloroacryloyl-, such as —CO—CH=CH—Cl, —CO—CCl=CH$_2$ or —CO—CCl=CH—CH$_3$, and furthermore —CO—CCl=CH—COOH, —CO—CH=CCl—COOH, β-chloropropionyl-, 3-phenylsulphonylpropionyl-, 3-methylsulphonylpropionyl-, 2-fluoro-2-chloro-3,3-difluorocyclobutane-1-carbonyl-, 2,2,3,3-tetrafluorocyclobutane-1-carbonyl- or 1-sulphonyl-, β-(2,2,3,3-tetrafluorocyclobut-1-yl)-acryloyl-, α- or β-bromoacryloyl- or α- or β-alkyl- or -arylsulphonylacryloyl- group, such as α- or β-methylsulphonylacryloyl-, chloroacetyl, vinylsulphonyl or —SO$_2$CH$_2$CH$_2$Y, where Y=a group which can be split off under alkaline conditions, in particular —OSO₃H, —OCOCH₃, Cl, Br, F, —SSO₃H, —OPO₃H₂, —O-COC₆H₅, di-C₁-C₄-alkylamino, quaternary ammonium, in particular —N⊕(C₁-C₄-alkyl)₃anion⊖, —O-SO₂CH₃, —SCN, —NH—SO₂CH₃, —OSO₂—C₆H₄—CH₃, —OSO₂—C₆H₅, —OCN,

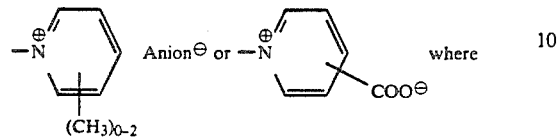

anion = for example —OSO₃H, —SSO₃H, —OPO₃H₂, —Cl, —Br, —F, —SCN, —OCN, —OSO₂CH₃, —OSO₂C₆H₅, OCOCH₃, —I, —OSO₂OCH₃, —OSO₂C₆H₄CH₃ or —OCOC₆H₅, preferred reactive dyestuffs of the formula (1) being those in which Z denotes a pyrimidinyl, methylpyrimidinyl or triazinyl radical.

Dyestuffs which are to be singled out in particular are those of the formula

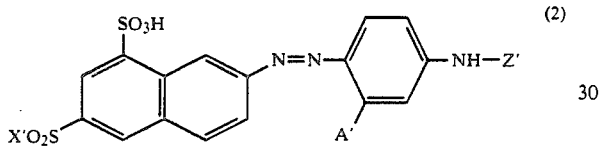

wherein
X' = CH=CH₂ or CH₂CH₂OSO₃H,
A' = CH₃, OCH₃, NHCONH₂, NHCOCH₃, NHCOCH₂OH, NHCO—(CH₂)₂—CO₂H,

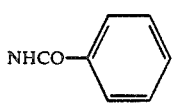

or NHSO₂CH₃ and

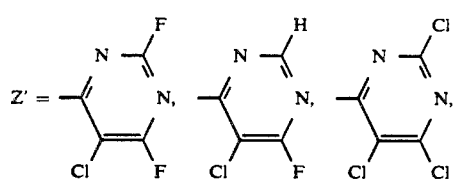

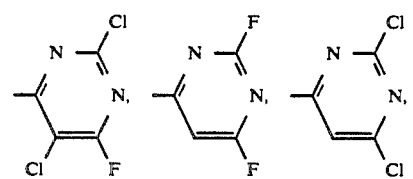

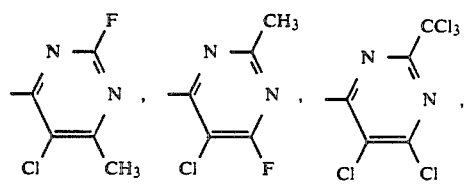

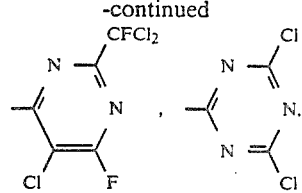

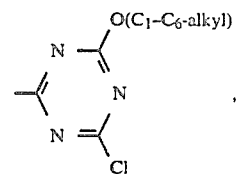

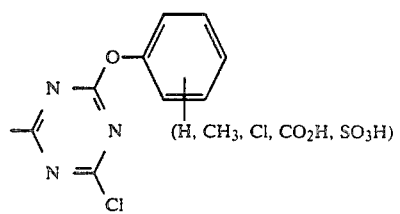

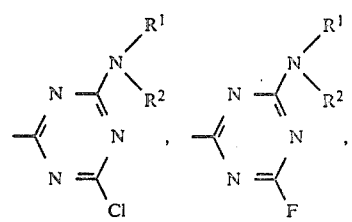

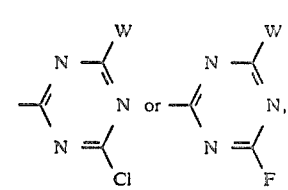

where
R¹ = H, optionally substituted C₁-C₆-alkyl or an optionally substituted cycloaliphatic radical. (Substituents, for example, acylamino, hydroxyl, halogen, sulpho, carboxyl, sulphato, β-sulphatoethylsulphonyl, C₁-C₄-alkoxy, phenyl, phenyl which is substituted by sulpho, carboxyl or β-sulphatoethylsulphonyl and hetaryl), R² = H, optionally substituted C₁-C₆-alkyl or optionally substituted phenyl, naphthyl or hetaryl; (substituents for the alkyl radicals or acetylamino are hydroxyl, cyano, halogen, sulpho, carboxyl, sulphato, SO₂X or alkoxy); (substituents for the phenyl, naphthyl or hetaryl radicals are, for example, carboxyl, sulpho, C₁-C₄-alkyl, C₁-C₄-alkoxy, hydroxyl, chlorine and β-sulphatoethylsulphonyl).

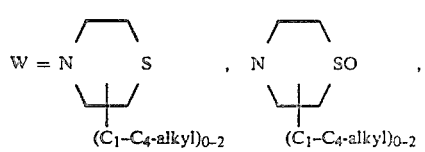

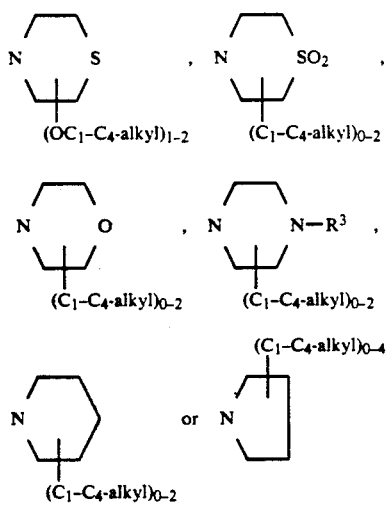

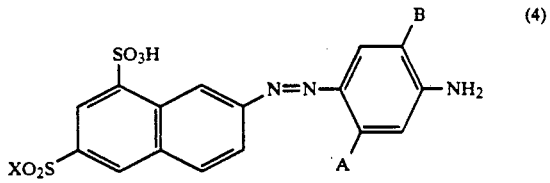

which are accessible by diazotization of 2-naphthylamines of the formula (5) and coupling to aniline derivatives (6)

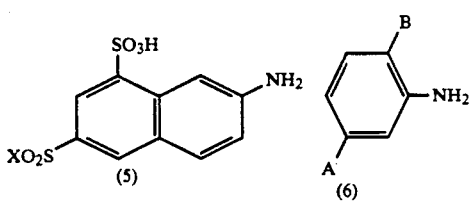

wherein
R³=H or C₁-C₆-alkyl which is optionally substituted by substituents which confer water-solubility. Suitable substituents for R³ are, in particular, OH, OSO₃H, SO₃H and COOH.

are subjected to a condensation reaction with reactive components Z-Hal, where Hal=Cl, F or Br, H-Hal being split off, to give bifunctional reactive dyestuffs of the formula (1), or are reacted with trihalogeno-s-triazine to give dyestuffs of the formula

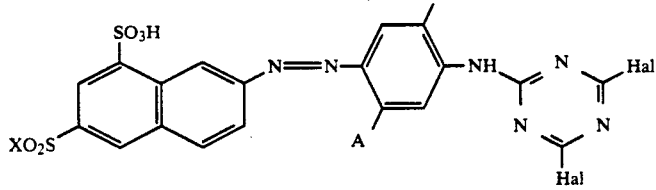

Preferred dyestuffs of the formula (2) are those of the formula which are then subjected to a condensation reaction with amines, hydroxyl compounds or other nucleo-

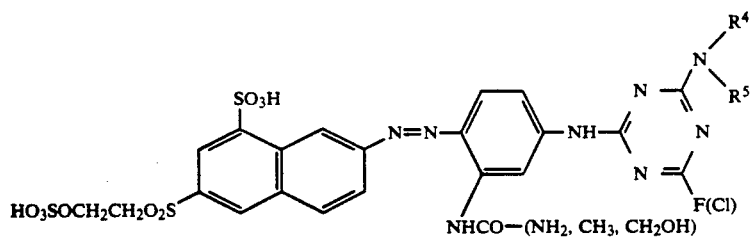

wherein
R⁴=a C₁-C₆-alkyl radical which is substituted by OH, SO₃H, OSO₃H, or SO₂X or CO₂H, or a phenyl radical which is substituted by β-sulphatoethylsulphonyl, and
R⁵=H, C₁-C₄-alkyl or a C₁-C₆-alkyl radical which is substituted by OH, SO₃H, OSO₃H, SO₂X or CO₂H.

The new dyestuffs can be obtained by the preparation processes customary in reactive dyestuff chemistry. In these, colour bases of the formula philes to give dyestuffs of the formula (1, Z=triazinyl radical), H-Hal being split off.

The new dyestuffs are suitable for dyeing and printing materials containing hydroxyl and amido groups, in particular cellulose materials. They are distinguished by a high reactivity and a high degree of fixation. The dyeings or prints obtainable with these dyestuffs on cellulose materials are also distinguished by a high fibre/dyestuff bond stability and by an outstanding stability towards oxidizing agents, such as detergents containing peroxide or chlorine. The ease with which the hydrolysis products formed to only a minor degree during dyeing or printing can be washed out is high. The dyestuffs have good wet fastness properties.

The formulae given are those of the free acids. The salts, in particular the alkali metal salts, such as sodium, potassium or lithium salts, are in general obtained during the preparation.

The dyestuffs can be employed either as solid formulations or as concentrated solutions.

EXAMPLE 1

65.1 g of the monopotassium salt of 6-(β-sulphatoethylsulphonyl)-8-sulpho-2-naphthylamine are suspended in 400 ml of water, 200 g of ice and 60 ml of approximately 30% strength aqueous hydrochloric acid are added and the amine is rapidly diazotized with 5N sodium nitrite solution. After the mixture has been stirred at 10° to 15° C. for one hour, the excess nitrous acid is removed with sulphamic acid. This cream-coloured suspension is now slowly metered into a neutral solution of the coupling component, which has been prepared from 27.0 g of N-(3-aminophenyl)-acetamide hydrochloride, 100 ml of water, 100 g of ice and about 30 ml of 10% strength aqueous lithium hydroxide solution. During this metering, the pH of the reaction mixture is kept constant at 6.0–6.5 with 20% strength aqueous potassium bicarbonate solution. When the addition has ended, the mixture is subsequently stirred for 30 minutes, the pH still being kept constant.

The red-brown coupling solution is cooled to 0° C. and 13 ml (about 20.3 g) of trifluoro-s-triazine are added. The pH is kept constant between 6.0 and 6.2 by addition of potassium bicarbonate solution or sodium carbonate solution. The condensation reaction has ended after about 5–10 minutes. A solution of 29.3 g of the sodium salt of 2-methylamino-1-ethanesulphonic acid in 100 ml of water is added and the pH is controlled at between 7.5 and 8.0 with sodium carbonate solution. The mixture is subsequently stirred for 2 hours, during which the temperature is allowed to rise to 20°–25° C. 4 g of active charcoal are added and after stirring for a further 15 minutes, the dyestuff solution is clarified over a filter.

The product is salted out with 130 g of sodium chloride and 130 g of potassium chloride. The precipitate is isolated and dried. The orange-red salt-containing dyestuff powder, which has the structure

| Example | Amine | |
|---|---|---|
| 2 | —NH—CH₂CH₂SO₃H | |
| 3 | —N(morpholino) | (408 nm) |
| 4 | —N(piperazino)NCH₂CH₂OH | |
| 5 | —N(CH₂CH₂OH)₂ | (407 nm) |
| 6 | —NH—CH₂CH₂OH | (405 nm) |
| 7 | —NH—CH₂CH₂OSO₃H | |
| 8 | —NH—CH₂—CO₂H | (405 nm) |
| 9 | —N(CH₃)—CH₂—CO₂H | |
| 10 | —HN—CH₂CH₂O—CH₂CH₂SO₂—CH=CH₂ | |
| 11 | —NH—C₆H₄(SO₂CH₂CH₂OSO₃H) (meta) | |
| 12 | —NH—C₆H₄—SO₂CH₂CH₂OSO₃H (para) | |
| 13 | —NH—C₆H₄—SO₃H (meta) | |
| 14 | —NH—C₆H₄—CO₂H (ortho) | |

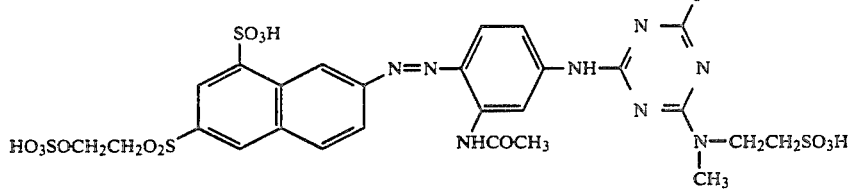

dyes cotton in a brilliant golden yellow-coloured shade. (λ_max (H₂O) = 404 nm).

Further useful golden yellow reactive dyestuffs of the formula

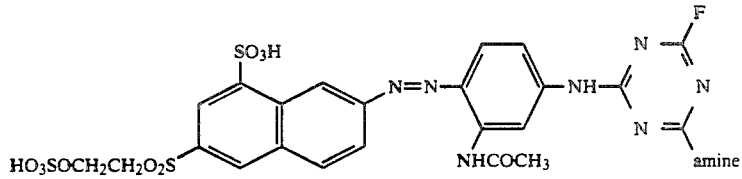

are possible analogously to Example 1 by varying the amine component

-continued

| Example | Amine |
|---|---|
| 15 | —N(CH₃)—CH₂SO₃H |
| 16 | —NH—CH₂CH₂CO₂H |
| 17 | —NH—CH(CO₂H)—CH₂CO₂H |
| 18 | —NH—CH(CO₂H)—CH₂CH₂CO₂H |

Corresponding monochlorotriazine dyestuffs are obtained if cyanuric chloride (=trichloro-s-triazine) is now employed instead of trifluoro-s-triazine analogously to Examples 1 to 18.

If N-(3-aminophenyl)urea, 3-methoxyaniline or N-(3-aminophenyl)-α-hydroxyacetamide is used instead of N-(3-aminophenyl)acetamide as the coupling component in Example 1 and the reactive component and amine are varied, further useful golden yellow dyestuffs of the formula

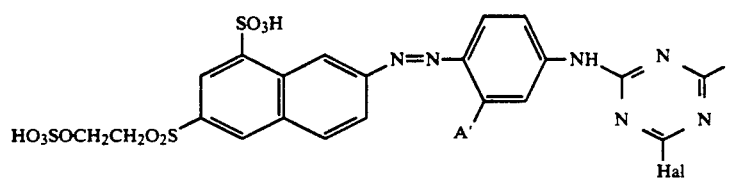

amine result.

| Example | A' | Hal | Amine |
|---|---|---|---|
| 19 | NHCONH₂ | F | —NH—CH₂CH₂—SO₃H |
| 20 | NHCONH₂ | F | —N(CH₃)—CH₂CH₂OH |
| 21 | NHCONH₂ | F | —N(morpholino)O |
| 22 | NHCONH₂ | Cl | —NH—C₆H₄—SO₂CH₂CH₂OSO₃H |
| 23 | NHCONH₂ | F | —NHCH₂CH₂OCH₂CH₂SO₂CH₂CH₂Cl |
| 24 | OCH₃ | F | —N(CH₃)—CH₂CH₂SO₃H |
| 25 | OCH₃ | F | —N(morpholino)O |
| 26 | OCH₃ | F | —NH—CH₂—CO₂H |
| 27 | OCH₃ | Cl | —NH—C₆H₄(3-SO₂CH₂CH₂OSO₃H) |
| 28 | OCH₃ | Cl | —NH—C₆H₄—CO₂H |

-continued

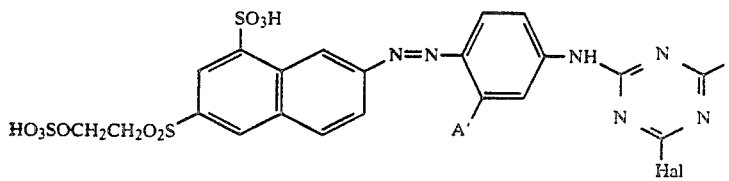

amine result.

| Example | A' | Hal | Amine |
|---|---|---|---|
| 29 | NHCOCH$_2$OH | F | —N(morpholine) |
| 30 | NHCOCH$_2$OH | F | —N(piperazine)NCH$_2$CH$_2$OH |
| 31 | NHCOCH$_2$OH | F | —NH—CH$_2$CO$_2$H |
| 32 | NHCOCH$_2$OH | F | —N(CH$_2$CH$_2$OH)$_2$ |
| 33 | NHCOCH$_2$OH | Cl | —NH—C$_6$H$_4$—SO$_2$CH$_2$CH$_2$OSO$_3$H |

EXAMPLE 34

65.1 g of the monopotassium salt of 6-(β-sulphatoethylsulphonyl)-8-sulpho-2-naphthylamine are diazotized analogously to Example 1 and coupled onto 30.1 g of N-(3-aminophenyl)succinic acid monoamide, which has been prepared from 1,3-diaminobenzene and succinic anhydride, at pH 6.0–6.5 and 10°–12° C. in accordance with Example 1. The coupling solution is then subjected to a condensation reaction with 26 g of 5-chloro-2,4,6-trifluoropyrimidine at 15° C. During this reaction, the pH is kept constant at 7.0–7.5 by addition of sodium carbonate solution. The condensation reaction has ended after about 2 hours. The mixture is heated to 40°–45° C. at pH 7, 5 g of active charcoal are added and the mixture is clarified over a paper filter. The solution is cooled. 70 g of sodium chloride are added, the mixture is stirred for 30 minutes and the dyestuff which has precipitated is isolated and dried. The dyestuff has the structure

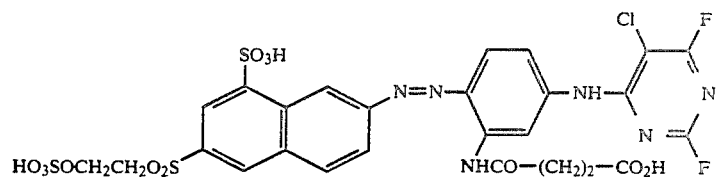

and dyes cotton in brilliant golden yellow-coloured shades.

Further useful golden yellow reactive dyestuffs can be prepared analogously to Example 34 by varying the reactive component.

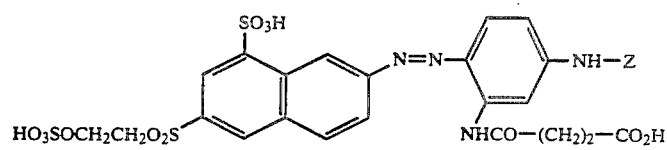

| Example | Z |
|---|---|
| 35 | (5-chloro-4,6-difluoropyrimidin-2-yl) |

-continued
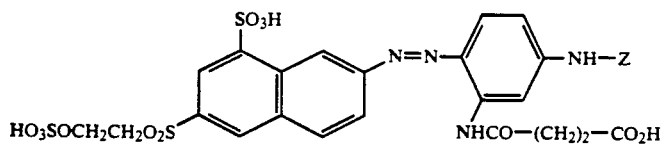
| Example | Z |
|---|---|
| 36 | 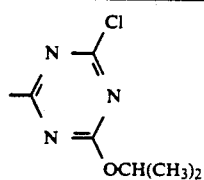 |
| 37 | 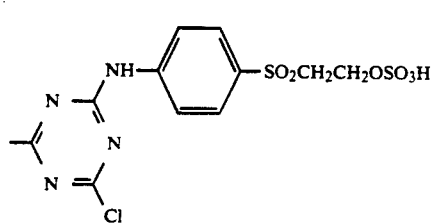 |
| 38 | 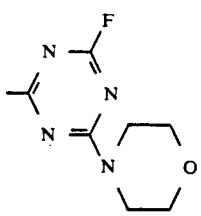 |
| 39 | 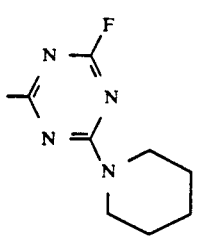 |
| 40 | 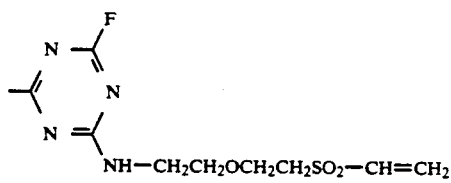 |
| 41 | 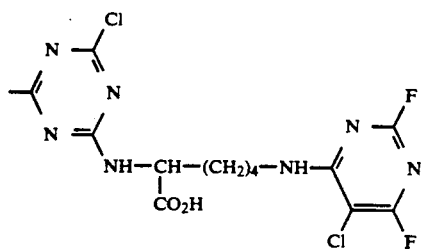 |
We claim:
1. A monoazo reactive dyestuff of the formula

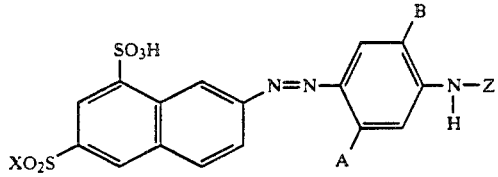 (1)

wherein
A = H, halogen, alkyl, alkoxy, —NHCOR, —NHCONH$_2$, —NHCONHR', —NHSO$_2$R", NHCOOR", or amino,
R = H, C$_1$–C$_6$-alkyl, cycloalkyl, C$_2$–C$_6$-alkenyl, phenyl, phenyl-C$_1$–C$_4$-alkyl, naphthyl, phenoxy or C$_1$–C$_4$-alkoxy,
R' = C$_1$–C$_6$-alkyl, cycloalkyl, phenyl-C$_1$–C$_4$-alkyl, or phenyl, and
R" = C$_1$–C$_6$-alkyl or phenyl,
the alkyl, cycloalkyl, alkenyl, phenyl, phenylalkyl, naphthyl, phenoxy, and alkoxy groups in the case of R, R', and R" being either unsubstituted or substituted by customary dyestuff substituents,
B = H, alkyl or alkoxy,
X = —CH=CH$_2$ or —CH$_2$CH$_2$—Y, where
Y = a radical which can be removed under alkaline conditions, and

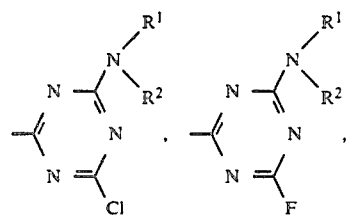

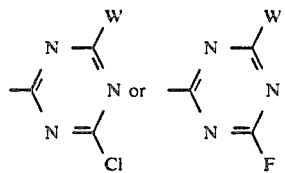

where
R$^1$ = H, C$_1$–C$_6$-alkyl or a cycloaliphatic radical, the alkyl and cycloaliphatic radical being unsubstituted or substituted by hydroxyl, halogen, sulpho carboxyl, sulphato, β-sulphatoethylsulphonyl, C$_1$–C$_4$- alkoxy, phenyl, phenyl which is substituted by sulpho, carboxyl or β-sulphatoethylsulphonyl,
R$^2$ = H, C$_1$–C$_6$-alkyl which is unsubstituted or substituted by hydroxyl, cyano, halogen, sulpho, carboxyl, sulphato, SO$_2$X or alkoxy or is phenyl or naphthyl which is unsubstituted or substituted by carboxyl, sulpho, C$_1$–C$_4$-alkyl, C$_1$–C$_4$-alkoxy, hydroxyl, chlorine and β-sulphatoethylsulphonyl,

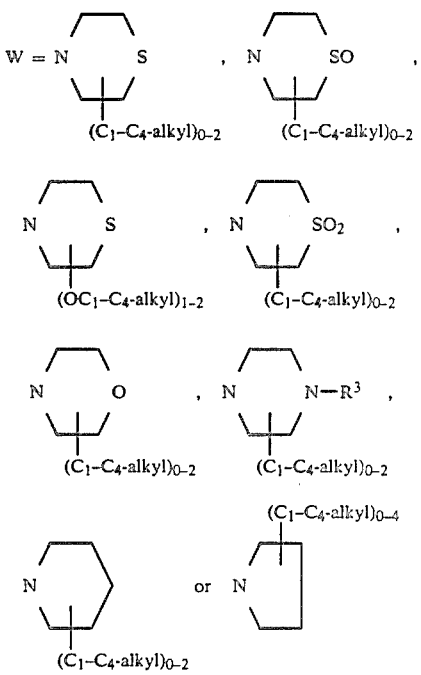

wherein
R$^3$ = H or C$_1$–C$_6$-alkyl which is unsubstituted or substituted by OH, OSO$_3$H, SO$_3$H or COOH.

2. A dyestuff of claim 1 of the formula

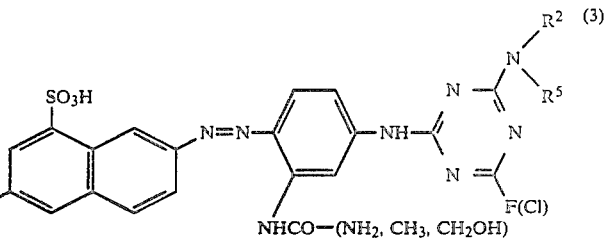

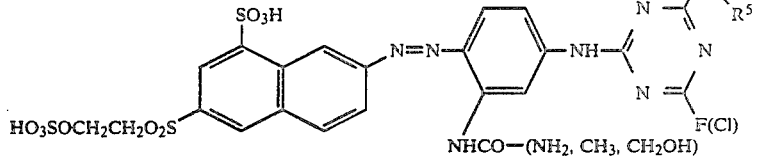

wherein
R$^2$ = a C$_1$–C$_6$-alkyl radical which is substituted by OH, SO$_3$H, OSO$_3$H, SO$_2$X or CO$_2$H, or a phenyl radical which is substituted by β-sulphatoethylsulphonyl, and
R$^1$ = H, C$_1$–C$_4$-alkyl or a C$_1$–C$_6$-alkyl radical which is substituted by OH, SO$_3$H, OSO$_3$H, SO$_2$X or CO$_2$H.

* * * * *

UNITED STATES PATENT AND TRADEMARK OFFICE
CERTIFICATE OF CORRECTION

PATENT NO.   : 5,095,102

DATED        : March 10, 1992

INVENTOR(S)  : Herd et al.

It is certified that error appears in the above-identified patent and that said Letters Patent is hereby corrected as shown below:

Col. 23, line 26    Insert -- Z= --

Col. 24, line 50    Delete " 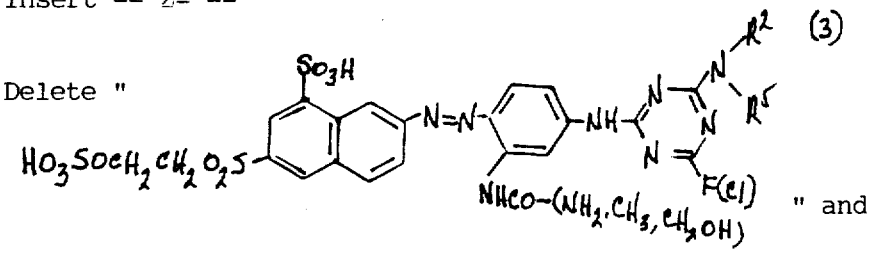 " and substitute 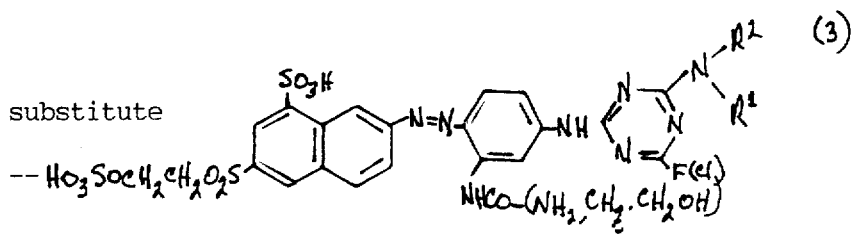

Signed and Sealed this

Sixth Day of July, 1993

Attest:

MICHAEL K. KIRK

*Attesting Officer*     *Acting Commissioner of Patents and Trademarks*